United States Patent [19]
Talbott et al.

[11] 3,843,756
[45] Oct. 22, 1974

[54] METHOD FOR FORMING BOARDS FROM PARTICLES
[75] Inventors: John W. Talbott; James D. Logan, both of Moscow, Idaho
[73] Assignee: Berol Corporation, Danbury, Conn.
[22] Filed: June 2, 1972
[21] Appl. No.: 259,099

[52] U.S. Cl. .................... 264/24, 264/91, 264/108, 264/121
[51] Int. Cl. ............................................ B29j 5/00
[58] Field of Search ............... 264/24, 108, 121, 91

[56] References Cited
UNITED STATES PATENTS
2,711,381  6/1955  Norotny et al. .................... 264/121
3,497,419  2/1970  Winer et al. ........................ 264/24

FOREIGN PATENTS OR APPLICATIONS
816,285  7/1959  Great Britain ....................... 264/24

Primary Examiner—Robert F. White
Assistant Examiner—J. R. Hall
Attorney, Agent, or Firm—Arthur B. Colvin

[57] ABSTRACT

Method for forming boards and slats by consolidation of a mat of individual elongated fibers and particles which are preliminary aligned or oriented in the same direction by free-fall through an electric field in order to achieve the desired physical properties such as stiffness, strength, and dimensional stability in the grain direction.

2 Claims, 8 Drawing Figures

PATENTED OCT 22 1974  3,843,756

PATENTED OCT 22 1974　　　　3,843,756

METHOD FOR FORMING BOARDS FROM PARTICLES

BACKGROUND OF THE INVENTION

1. Field of the Invention

This invention relates to materials usually called particleboards, fiber boards, flakeboards, hardboards, strand boards, slats for pencil stock, and the like, produced by consolidation of furnishes consisting of lignocellulosic fibers and particles with or without adhesive coatings, impregnating materials, water repellents, preservatives, fire retardants, fillers, or other additives. The fibers and particles may be derived from natural products such as wood, bark, straw, grass, bagasse, and the like, or any combination of these or similar materials, or from other natural or synthetic organic or inorganic materials. Said particles may be in the form of flakes, strands, fibers, fiber bundles, shavings or combinations of these. The only limitation on particle form or shape for the effective operation of the method of this invention is that a substantial portion of the particles should be elongated in the stronger, or grain direction of the material from which the particles are formed. Methods of formation of such particles are well known in the previous art.

2. Description of the Prior Art

The present invention differs from the following two categories of prior art. The first category is that of mechanical orientation involving freefall of elongate particles through parallel arrays of stationary or vibrated baffles, bars, or slots. Such mechanical methods, however, are only amenable to orientation of relatively large strands, splinters, or long flakes, one of the reasons being that achievement of good orientation by such means depends on maintaining the distance from the bottom of the confining baffles, bars, or slots to the top of the forming mat below, to be just a little less than the length of the particles to be oriented. This requirement renders such methods impractical for wood fibers or particles of small dimension because the free surface of the forming mat cannot be relied upon to be planar, but is subject to irregularities of greater magnitude than the length of wood fibers and other small particles. Another related disadvantage of the mechanical methods of orientation is that if the apparatus is designed and adjusted for one length of particle, it will afford little or no orientation for shorter particles, and it is difficult to prepare a particleboard furnish without inclusion of a considerable amount of such shorter particles unless considerable waste is acceptable.

The second category of prior art is that involving electrical field means of causing a single layer of particles such as abrasive grits or carpet pile to be aligned perpendicularly to an adhesive-coated substrate to which they are to be attached. Such methods and apparatus involve placing a net charge on substrate and particles and would be totally inapplicable to the object of the present invention which requires building up a thick mat of particles directionally aligned in the plane of the mat.

SUMMARY OF THE INVENTION

The present invention is concerned with a method for producing boards and slats made from elongated particles which comprises passing the separate and discrete particles, by gravity, through an electric field within which said particles become aligned parallel to the plane of a mat formed by said particles at the bottom of said field.

An object of the present invention is to provide a method to achieve in such products strength, stiffness and dimensional stability in a preferred direction by effecting directional alignment of elongate particles of various lengths even in furnishes having a mixture of particles with lengths ranging from several inches down to small fractions of an inch as in single wood fibers.

A further object is to achieve this particle alignment by causing the separate particles to free-fall through an electric field whose direction is parallel to the desired direction of orientation of the particles.

It was found that the effectiveness of orientation is a function of moisture content, and that good orientation is achievable within the usual moisture content range for particle-board furnish.

An elongate, conductive particle when placed in an electric field will experience charge migration resulting in a collection of charge toward the ends of the particle. The interaction of this induced charge with the electric field then results in a torque tending to align the long axis of the particles with the direction of the field. The geometry of the apparatus is arranged so that the field is substantially uniform in the area of particle free-fall down to and including the forming mat. The mat thus built up of particles having their grain directions substantially aligned can then be hot-pressed in the usual manner to make a consolidated board having greater strength, stiffness and dimensional stability in the desired direction than afforded by random orientation processes.

These and other novel features and advantages of the present invention will be described and defined in the following specification and claims.

DESCRIPTION OF THE PREFERRED EMBODIMENTS

Figure 1:
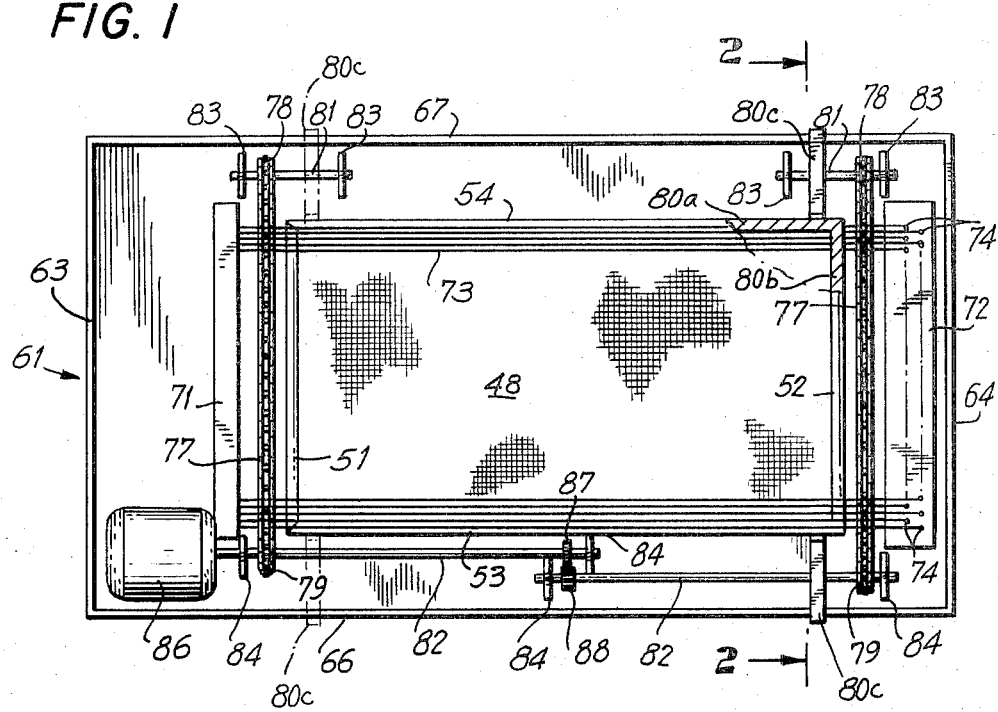
FIG. 1 is a diagrammatic top view of one embodiment of the apparatus of the present invention for forming the particulate fiber mat from which slats and boards are subsequently formed, some parts being omitted.

The process of the present invention is carried out by first preparing a quantity of fibers which, for the particular purpose of making pencil slats, may be composed of a furnish made of milled incense cedar chips. The fibers, which, in one embodiment, have a residual moisture content of about 12%, are first fluffed by passing them twice through a rectangular box-like fiber fluffer, generally designated 11, as diagrammatically shown in FIGS. 3 and 4. The fibers are dropped through the top hopper portion 12 of the apparatus where they pass downwardly between inwardly and downwardly extending opposing baffle plates 13 attached to the inner walls of the fluffer. The fibers drop between a pair of counter-rotating spike rolls 14 and 16, having a plurality of ranks of respective diagonal spikes 17 and 18 slightly spaced apart from each other and mounted on axles 19 and 21, respectively. The ranks of said spikes alternate with each other along the longitudinal direction of the respective axles of said rolls. Rolls 14 and 16 rotate at different speeds, and in one embodiment roll 14 may rotate at 200 rpm and roll 16 may rotate at 1500 rpm in the respective directions of the arrows, as marked in FIG. 3.

Figure 4:
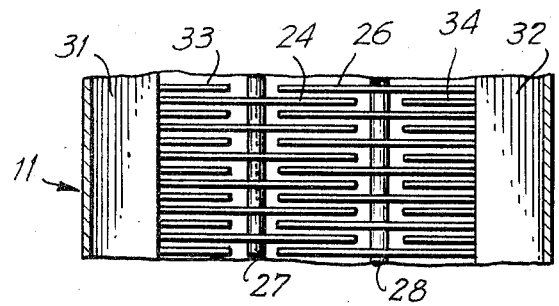
FIG. 4 is a fragmentary view taken on line 4—4 of FIG. 3.

After passing between moving spike rolls 14 and 16 the fibers descend by gravity to another pair of counterrotating spike rolls 22 and 23 having ranks of spikes 24 and 26, respectively, which are alternately intermeshed as indicated in FIG. 4 and which are mounted on axles 27 and 28, respectively.

Mounted laterally on opposite interior walls of fluffer 11 are downwardly and inwardly extending brackets 31 and 32 to the inner ends of which are mounted downwardly and inwardly extending spaced elongated stationary comb teeth 33 and 34, respectively. Comb teeth 33 and 34 are mounted alternately between and intermesh with ranks of spikes 24 and 26, respectively, whereby they perform the function of ensuring the separation of the particles. In some embodiments, rolls 22 and 23 are counter-rotating as indicated by the arrows in FIG. 3, and in one embodiment they rotate at 1500 rpm, thereby ensuring the proper fluffing of the fibers. After passing through the spikes of rolls 22 and 23, the fluffed fibers descend by gravity past inwardly and downwardly extending baffle plates 36 and 37 attached to the interior walls of fluffer 11 and thereafter fall into a suitable collecting bin 38.

Thereafter, the fibers are placed in a rotating-drum blender and tumbled for a short time with a suitable binder such as a powdered phenolic resin which, in one embodiment, may comprise B-staged phenol formaldehyde resin in the form of a fine, dry powder. The amount of resin may range from 5–15% of the total weight of the fibers. In one embodiment, good results have been achieved by providing for 10% of resin for mixing with dry fiber. The mixing of the fibers and the resin is performed for only a sufficient amount of time to distribute the resin, and no more, and in some methods of the present invention the mixing time takes approximately 1 minute.

Figure 3:
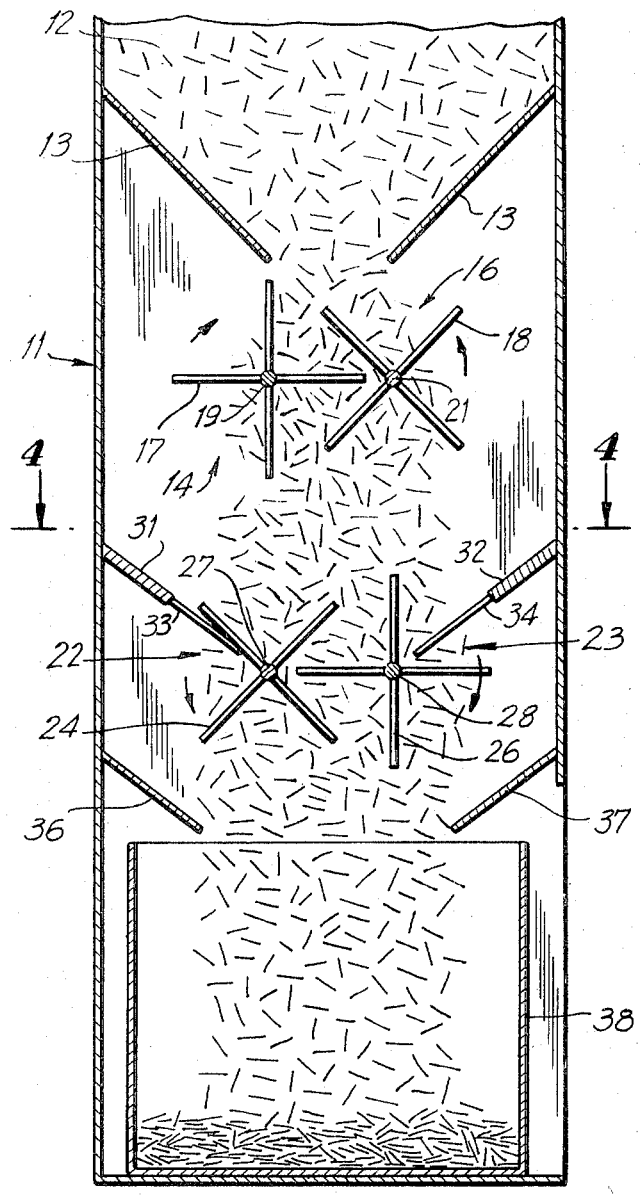
FIG. 3 is a diagrammatic view of a vertical section of apparatus utilized in preparing the particulates and fibers for subsequent processing in the apparatus shown in FIGS. 1 and 2, some parts being omitted.

After the fibers have been mixed with the resin, they are then passed again through the fluffing apparatus as shown in FIG. 3 so as to reduce and eliminate any clumping that may have occurred in the mixing operation and to help distribute the resin uniformly amongst the fibers. The mixture of fibers and resin, which is also referred to as blended furnish, is then weighed out into batches for individual boards and is placed in covered containers to prevent moisture loss while awaiting the felting operation.

Figure 2:
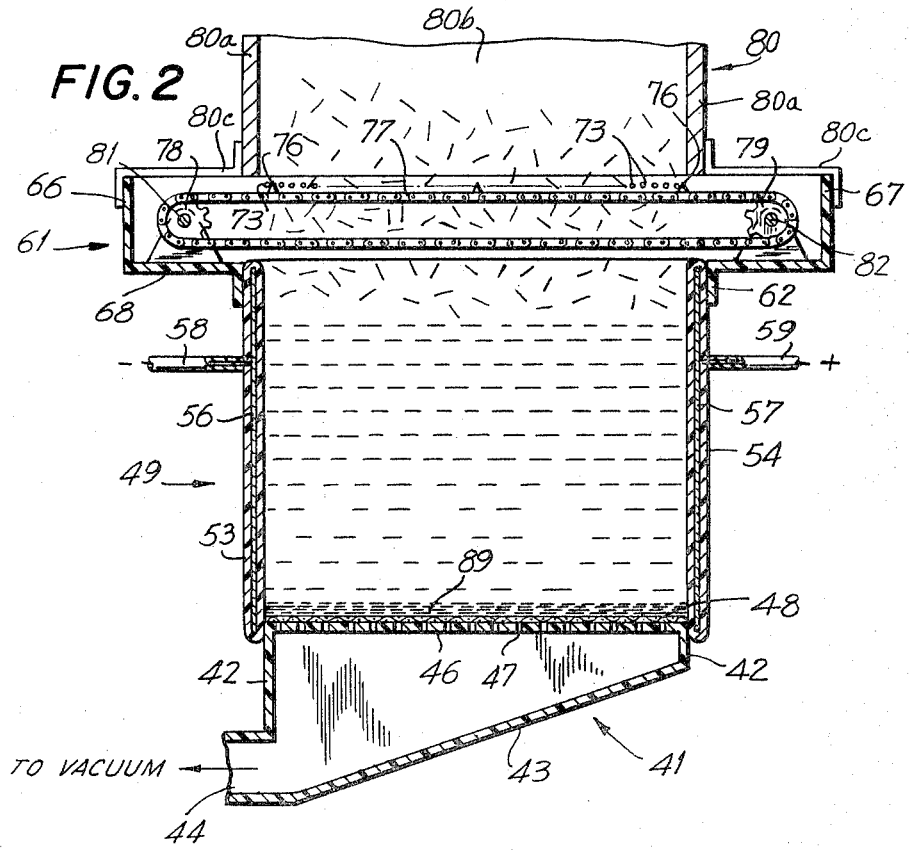
FIG. 2 is a section view taken on line 2—2 of FIG. 1.

The felting operation is conducted in apparatus that is diagrammatically illustrated in FIGS. 1 and 2 of the drawings. This apparatus comprises, on the bottom thereof, a vacuum box, generally designated 41, the top of which is rectangular in shape and, in one embodiment, may be approximately 8 × 15 inches in the horizontal dimension. Vacuum box 41 is enclosed by four vertical walls 42 and an inclined integrally formed bottom plate 43 which leads to a vacuum port 44 connected to a source of suitable negative pressure, not shown. Mounted on top of walls 42 is a rectangular cover plate 46 which has a plurality of uniformly distributed apertures 47. The entire vacuum box 41 and cover plate 42 are made of an electrically non-conducting transparent acrylic plastic or other suitable insulating material. Positioned on the top of cover plate 46 is a non-conducting woven screen 48 which may be made of a suitable material such as Fiberglas-reinforced plastic. This screen is intended to prevent the entry of fibers into the vacuum box.

A rectangular deckle box, generally designated 49, is removably mounted with a close fit on the top of vacuum box 41. In one embodiment, the deckle box is 8 inches deep × 8 inches wide and 15 inches long. The two spaced vertical end walls 51 and 52 of box 49 are each 8 × 8 inches. The two vertical 8 × 15 inches side walls 53 and 54 are made of a double layer of acrylic plastic with an interior sandwiched aluminum foil 56 and 57, respectively, which serve as electrodes. Connected to each electrode 56 and 57 are insulated electrical leads 58 and 59, respectively, which are electrically connected to respective terminals of a high-voltage 60 Hertz A.C. transformer, not shown, whose primary windings are fed from a variable auto-transformer, not shown, connected, in turn, to a suitable source of electric power. This arrangement affords a controllable (zero to 30,000 volt) A.C. potential across the deckle box in the 8 inches horizontal direction, resulting in a substantially uniform horizontal electric field within the deckle box, said field being controllable in the range of zero–3750 rms volts per inch. It is understood that the end walls 51 and 52 are also made of a suitable insulating material and should preferably be transparent or translucent.

Removably positioned on the open top of deckle box 49 is a frame, generally designated 61. Frame 61 has an integrally formed rectangular downwardly extending flange 62 which removably and slidably fits over the top portion of deckle box 49 and which is supported thereby. Frame 61 has upwardly extending vertical end walls 63 and 64, and upwardly extending vertical side walls 66 and 67. The longitudinal and lateral dimensions of frame 61 are somewhat greater than the corresponding dimensions of deckle box 49 whereby the horizontal floor 68 extending outwardly in all directions from the top of said deckle box is arranged to support various mechanisms as will be described hereinafter.

Mounted rigidly on frame 61 are spaced brackets 71 and 72 extending perpendicularly of the longitudinal dimension of said frame. Stretched horizontally between brackets 71 and 72 is a plurality of parallel longitudinally arrayed nylon monofilament strings 73. One end of each string 73 is secured fast on bracket 71 while the other end of each string is secured aroung respective tuning pegs 74 to facilitate the tuning of the strings to approximately 500 Hertz. Said strings, which are spaced apart approximately one-tenth of an inch, may be drawn over elevated steel bridges (not shown) to ensure that the strings lie in a planar array.

The array of strings 73 is located in a horizontal plane spaced slightly above the upper horizontal plane in which chains 77 travel. The array of strings is vibrated by being plucked near each end thereof by means of traveling picks 76 mounted at approximately 4 inch intervals on roller chains 77 that are moved on sprockets 78 and 79, respectively. Sprockets 78 and 79 are mounted on suitable shafts 81 and 82, respectively, secured on frame 61 by means of paired brackets and bearings 83 and 84, respectively. One of the shafts 82 is connected to and rotated by electric gear motor 86 with rotary motion of 240 rpm more or less being imparted to the second shaft 82 by means of gears 87 and 88 mounted fast on the respective first and second shafts 82.

With picks 76 being located on chains 77 below strings 73, the chain support sprockets being adjusted so that the upper portions of said picks have approximately one-sixteenth inch engagement with said strings. The travel of the two roller chains are in opposite directions at the end portions of strings 73 in order to prevent net lateral displacement of the furnish in the deckle box. It is also found desirable to provide a difference of one tooth in the number of teeth in the paired driving sprockets 78 and 79 for each of the two roller chains 77 in order to avoid any regular spatial periodicity that would otherwise be encountered if there were simultaneous engagement of both ends of the string by picks 76 on the two separate chains 77. By this means, random but continuous vibration of strings 73 is ensured.

OPERATION

In operation, a vacuum is applied to the interior of the vacuum box by means of a source of negative pressure, not shown, connected to port or outlet 44 in the form of a blower which effectively draws air downward through screen 48, through apertures 47 in cover plate 46, and through vacuum box 41. An adjustable blast gate, not shown, at vacuum port 44 controls the volume of air drawn through the apparatus and concomitantly the downward air velocity through the deckle box 49 and the mat of fibers being formed in the manner described hereinafter.

A suitable A.C. voltage is then applied to the deckle box electrode plates 56 and 57 after which the prepared particle furnish, in a weighed amount sufficient for one board or slat of the desired density, is gradually distributed by hand on the grid of vibrating strings 73 at a low enough rate to prevent build up of a mat on said strings and to ensure that the particles fall individually without clumping, balling, or sticking together and to achieve good alignment. The distribution is gauged to produce as nearly a uniform thickness of mat on the top of screen 48 as is possible at all times, as estimated visually with the aid of horizontal lines ruled at 1 inch spacing on the inside of the deckle box whose walls are made of transparent or translucent acrylic plastic.

In some embodiments, it may be necessary and useful to provide a rectangular hopper, generally designated 80, to be supported above the deckle box 49 in order to serve as a guide for particles that are to be dropped onto strings 73 for distribution into said deckle box.

The cross-section dimensions of hopper 80 are substantially coextensive with that of deckle box 49 and consist of spaced parallel side walls 80a and spaced parallel end walls 80b. Hopper 80 may be supported above deckle box 49 by means of one or more pairs of brackets 80c connected between respective side walls 80a and walls 66 and 67, respectively, of frame 61. Hopper 80 also serves to prevent particles or furnish from falling upon gears 78 and 79 and upon roller chains 77 and interfering with their smooth function.

The vibrating strings 73 produce an active sifting action which effectively breaks up any clumps of fiber as the furnish is placed by hand in the hopper. The vibrating strings afford a uniform shower of individual fibers or particles through the electric field of deckle box 49 so that their individual alignment by said electric field is not hindered. Sufficient space is provided between the sides of the hopper and the deckle box to allow free action of the strings 73, the vibration of which has both horizontal and vertical components.

As the separate elongated particles fall freely through the electric field established between foil electrodes 56 and 57, said electric field having a direction parallel to the desired direction of orientation of the discrete particles, said particles will experience a migration of electric charge resulting in collection of charge toward the ends of each particle. When the induced charge of each particle interacts with the directional electric field between foil electrodes 56 and 57, a resultant torque imposed upon each particle tends to align the long axis of the particle with the direction of said electric field. The top of deckle box 49 is sufficiently high so that there is ample space toward the bottom of said box within which said particle alignment takes place by the time the particles reach screen 48 and build up a mat 89 thereon. Thus, the geometry of the apparatus is arranged to provide for the electric field to be substantially uniform in the area of particle free-fall from the top down to and including the mat that is being built up. The resultant mat is therefore built up of particles having their grain directions substantially unidirectionally aligned in parallel array. Thus, when the mat is subsequently hot-pressed to make a board or slat, it will have superior strength, stiffness and dimensional stability in the desired direction.

Because wood particles have a tendency to acquire a net electrical charge during handling or conveying, and because such net charge causes the particles falling through the electrical field to be attached toward the electrode of opposite polarity, it has been found convenient, in one embodiment, to employ an alternating electric field of 60 Hertz between electrodes 56 and 57 in deckle box 49 in order to avoid net lateral displacement of such charged particles.

The action of the vacuum applied through vacuum box 41 results in a more compact mat 89 and tends to hold individual particles in place and in alignment on the surface of the mat until covered by subsequent layers of particles. While the provision of the vacuum is important when dealing with fine particles and fibers, it may also be possible to dispense with the vacuum when using large flakes or strands while, at the same time, the electrically induced alignment is ensured.

Generally, sufficient vacuum power is applied to bring about an air velocity through deckle box 49 of about 50 to 100 feet per minute, the optimum velocity being determined empirically when considering variables such as particle size and type, particle moisture content, field strength of electric field, the desired density of the forming particle mat, and the like.

When the desired amount of material has been deposited in mat 89, frame 61 with the string grid apparatus therein is lifted off deckle box 49 and the mat 89 is compressed with a plunger (not shown) made of insulating material, while maximum air flow is drawn through vacuum box 41. The air flow is then stopped, the plunger withdrawn, and thereafter the field voltage is turned off. Deckle box 49 is then lifted off vacuum box 41, and mat 89 is withdrawn on its supporting screen 48 and transferred to a heated hydraulic press for compaction and curing as in conventional particleboard practice. After hot pressing, the press is opened and the particleboard is removed for cooling. The resultant particleboard may be used for a wide variety of end products such as pencil slats, furniture finishes, structural building members such as tension, compression or bending members, stress-skin panels, or any other application requiring enhanced strength or stiffness and the like.

Figure 6:
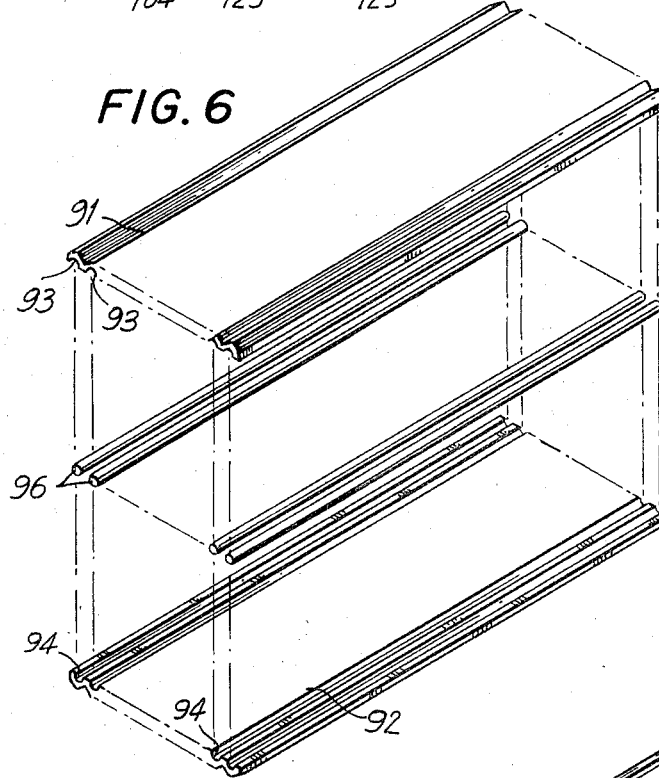
FIG. 6 is an exploded perspective view of the top and bottom slats and pencil lead representing an intermediate step in making lead pencils.
Figure 7:
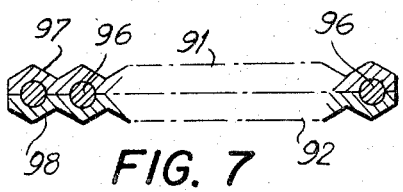
FIG. 7 is an enlarged lateral section view of the assembled slats and lead.
Figure 8:
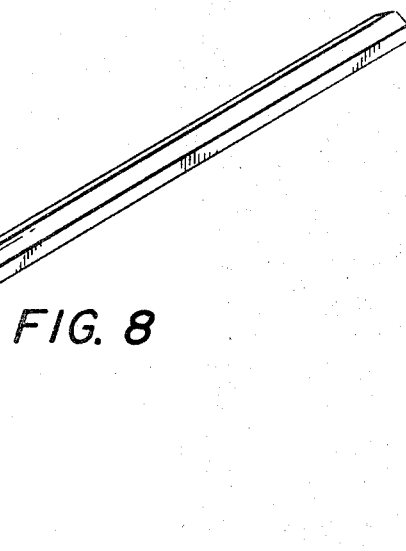
FIG. 8 is an enlarged perspective view of a finished pencil made in accordance with the method of and utilizing the apparatus of the present invention.

In the manufacture of pencils, a pair of upper and lower rectangular slats 91 and 92, respectively, is cut in suitable dimensions, as shown in FIG. 6. The bottom surface of upper slat 91 is then scored or routed by suitable means with semi-circular spaced, parallel grooves 93, while the upper surface of slat 92 is similarly provided with semi-circular spaced, parallel grooves 94, with a pair of aligned opposing grooves 93 and 94 accommodating therebetween an elongated pencil lead 96 when slats 91 and 92 are brought together. The upper surface of slat 91 and the bottom surface of slat 92 are also routed to form triangular grooves 97 and 98, respectively, the apices of corresponding grooves being vertically aligned with each other. When slats 91 and 92, with a pencil lead 96 located within each paired grooves 93 and 94, are pressed together with a suitable adhesive or bonding agent, said juxtaposed slats and pencil lead appear in cross-section as shown in FIG. 7. Thereafter, the bonded assembly of slats 91 and 92 and pencil leads 96 is cut by suitable means between the respective apices of paired grooves 97 and 98 to form individual pencils, generally designated 99, as illustrated in FIG. 8. Pencils made from slats by the process described hereinbefore where particles and fibers are now aligned unidirectionally parallel to the longitudinal axis of said pencils, manifest qualities of strength, stiffness and dimensional stability that are considerably superior to those in particleboard pencils made by other means.

Figure 5:
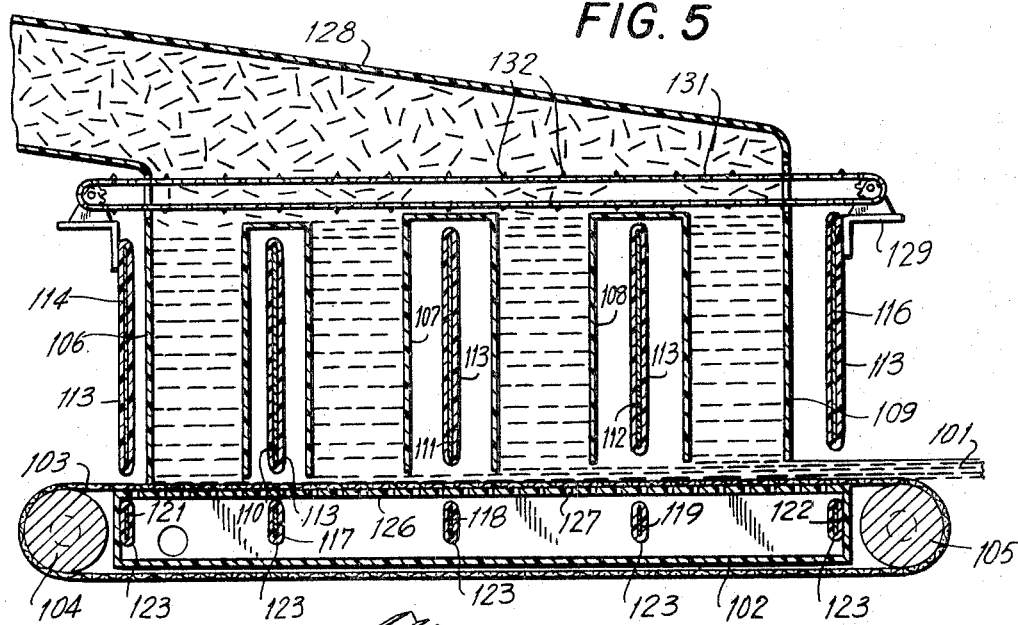
FIG. 5 is a diagrammatic fragmentary view of another embodiment of the apparatus for continuously forming the particulate fiber mat, some parts being omitted.

While a batch process for making pencil slats and particleboards has been described hereinbefore in conjunction with FIGS. 1 – 4 and 6 – 8, it is understood that the present invention also contemplates employing the same basic system in a continuous process such as, for example, with apparatus as shown diagrammatically in the partial vertical section in FIG. 5, and which is arranged to form a moving mat 101 of unidirectionally oriented particles. Here, the vacuum box 102 is elongated in the direction of mat travel whereby mat 101 is formed continuously on a non-conducting mesh screen 103 made in the form of an endless conveyor belt moving over spaced rollers 104 and 105 rotated by suitable means, not shown. Moving screen 103 is made of a fabric similar to that of screen 48 described in connection with FIG. 2. Located above moving screen 103 is a series of deckle boxes 106, 107, 108, and 109 made of electrically non-conducting material similar to that of deckle box 49, said deckle boxes being arranged in a row in the direction of mat travel with spaces arranged between adjacent boxes. Disposed vertically in the center of each space between deckle boxes 106, 107, 108 and 109, are vertical electrode plates 110, 111 and 112, each being sandwiched between insulation sheaths 113 in a manner similar to side walls 53 of deckle box 49. Similar electrode plates 114 and 116 are mounted at the beginning and end of the train of deckle boxes and suitably spaced apart therefrom. Electrode plates 114 and 116 are also sandwiched between insulating sheaths 113.

Aligned vertically below and in the same plane with each electrode plate 110, 111, 112, 114 and 116, are corresponding short secondary electrode plates 117, 118, 119, 121 and 122, this latter group of plates being located within vacuum box 102. Electrode plates 117, 118, 119, 121 and 122, are each sandwiched within insulating sheaths 123.

Alternate electrode plates in the series are charged by suitable connecting means, not shown, with opposite polarity from an A.C. high voltage source. All of the deckle boxes 106, 107, 108, and 109, and the primary or upper insulated electrode plates 110, 111, 112, 114 and 116, are so mounted as to be vertically adjustable to provide clearance above the sloping top of the moving mat 101 as it increases in thickness by accumulation of increments of oriented particles as it passes successively under each of said deckle boxes.

The purpose of secondary electrode plates 117, 118, 119, 121 and 122, in vacuum box 102 below the traveling mat 101, is to shape the electric field so that it is more nearly horizontal in the space just below the respective deckle boxes where the mat is forming. The top edges of secondary electrode plates 117, 118, 119, 121 and 122, should be located as close as possible to the bottom of the mat just beneath the cover plate 126 of vacuum box 102, said cover plate also having uniformly disposed apertures 127 therein. The purpose of the spacing between adjacent deckle boxes, in FIG. 5, is to confine the particle fall to that portion of the field having substantially horizontal direction. Thus, the length of this spacing will depend upon the vertical distance between paired primary and secondary electrode plates, said distance increasing down the line as the mat thickness increases.

The required ratio of deckle box spacing to mat thickness in the embodiment in FIG. 5 depends upon the character and fineness of the particles but will mostly be in the range of 1:3 as may be determined empirically in view of all attendant variables.

The length of the deckle boxes in the direction of mat travel is determined by the desired field strength and the maximum voltage for which the system can be reliably and safely insulated. The lateral dimension of the deckle boxes should, of course, be the width of the mat.

Delivery and dispersion of fibers and particles to the series of deckle boxes shown in FIG. 5 may be accomplished by way of a chute 128, the open bottom of which is positioned above the open tops of said deckle boxes. A flanged frame 129 is also mounted at the top of the assembly of the deckle boxes and supports one or more roller chains 131 on which is mounted a plurality of spaced picks 132 that perform the same plucking action upon the array of taut strings (not shown) comparable to the array of strings 73 in FIG. 1. The interior of vacuum box 102 is connected by suitable means, not shown, to a source of negative air pressure for establishing a suitable rate of free-fall of particles through the deckle boxes shown in FIG. 5.

The method of the present invention is not confined to alignment of wood particles or fibers for particleboard. Any natural or synthetic elongated particles, fibers, or whiskers of conductive or even slightly conductive material can be aligned for subsequent consolidation to structural materials. Non-conductive fibers can be aligned if they can be either transiently or permanently coated with a liquid or solid film of conductive material. Thus, high strength composite materials consisting of aligned fibers or whiskers imbedded in a suitable matrix material can be formed by coating the matrix material on the fibers or whiskers, and aligning the coated whiskers by the method described herein, if either or both the whiskers or matrix materials is slightly conductive.

It is understood that any one of a variety of suitable resins may be used in treating the fibers or particles prior to fluffing and the subsequent felting operation in deckle box 49. It is found, however, that liquid resins may cause tack and consequent clumping and balling which may interfere with felting and fiber alignment. Accordingly, it is preferable to utilize a resin such as B-staged phenol formaldehyde resin in the form of a fine, dry powder. In one embodiment, this resin comprises 10% by weight of the dry fibers or particles and, depending upon the nature and character of the fibers and the other desired properties of the final product, the resin may compose 5–15% by weight of the original dry fibers.

It is advantageous both to control the moisture content of the particles and fibers and to provide for appropriate field strength within the deckle box in order to achieve the desired quality of the end product. In one embodiment, the moisture content at the time of mixing of the fibers with the resin is approximately 12% while in other embodiments, the moisture content may range from 9 to 15%.

In various runs of the process described herein, an electric field strength of from 1500–3750 volts per inch was established. It has been found that the orienting torque applied by the electric field upon free-falling fibers and particles appears to increase as the square of the voltage at a given moisture content, but is very highly dependent upon moisture content at a given voltage. Thus, the requisite voltage for establishing the electric field within deckle box 49 may be empirically determined in accordance with the other accompanying factors such as moisture content of the fibers and particles.

The ambient humidity in the felting room must be taken into consideration since fine fibers and particles equilibrate quickly with air humidity. Thus, it is advantageous to control the humidity in the felting room. In one situation, a room humidity of 65 percent produces an equilibrium moisture content of approximately 12% at 70°F.

The moisture content of the furnish — that is, the fibers and particles combined with the resin — is an important factor in the successful operation of the process described herein. Too high a moisture content, — that is, over 20%, — produces excessive tack even with powdered phenolic resin — or even with no resin — and causes clumping of fibers in the felter thus affording poor orientation. Too high a moisture content in the furnish can also cause delamination when removing the board from the press. On the other hand, too low a moisture content results in poor resin flow and poor bonding when the mat is pressed into a particleboard. Also, too low a moisture content in the furnish affords little aligning torque in the electric field although this can be compensated somewhat by a higher voltage which is limited by the undesirable effects of high voltage breakdown.

At present, lead pencils are made of slats cut directly from wood stock which has been a satisfactory source of material for such products. In the present circumstances, however, the cost of wood stock has risen substantially and threatens to unduly increase the cost of making wood pencils as a mass consumer item. Accordingly, the present invention makes possible the manufacture of lead pencils of compacted unidirectionally oriented fibers which considerably decreases the cost of the product while achieving the strength, stiffness, and dimensional stability characteristics of the natural wood stock product. Pencils made with slats produced by the method and apparatus of the present invention exhibit qualities of density, bending strength, stiffness, flexural strength and sharpenability which compare favorably with pencils made from natural wood stock.

It is intended that when lead pencils are described and claimed herein, that the term subsumes pencils containing other than the graphite-type lead, such as colored crayons and other marking materials.

It is also intended that when lead pencils are described and claimed herein, that the term subsumes pencils containing other than fiber as the basic element. Likewise, it is intended that materials other than pencil slats may be produced from elements other than fibers.

We claim:

1. The method of producing a fiberboard comprising:

a. mixing a dry, powdered, thermo-setting polymeric bonding agent homogeneously with a multiplicity of elongated cellulosic fibers having a directional grain and a long axis in the direction of said grain, said fibers having a moisture content from about 9 to 15 percent on a dry weight basis;

b. depositing said mixture into a vertically oriented deckle box having said walls, an upper entrance and a lower exit, said mixture being deposited through said upper entrance to cause said mixture to fall vertically downwardly through said box toward said exit;

c. establishing between a pair of opposing side walls within said box, at an intensity of from about 1500 to 3750 volts per inch a horizontally directed electrical field to cause the fibers descending within said box to become oriented with said long axis aligned with the direction of said field, said field having alternating polarity to prevent movement of said fibers toward said walls and separation of said fibers from said bonding agent;

d. collecting said mixture of oriented fibers and bonding agent on an air pervious screen disposed beneath said exit of said deckle box, said screen having a partial vacuum therebeneath to form on said screen a mat of said fibers and bonding agent, said mat being retained in position by said partial vacuum;
e. removing said mat from said screen; and,
f. subjecting said mat to heat and pressure to consolidate said mat, activate said bonding agent, and bond said fibers into a fiberboard.

2. The method of claim 1 wherein said partial vacuum induces an air flow through said deckle box in the direction from said entrance to said exit at a velocity of about 50 to 100 feet per minute.

* * * * *

UNITED STATES PATENT OFFICE
CERTIFICATE OF CORRECTION

Patent No. 3,843,756          Dated October 22, 1974

Inventor(s) John W. Talbott; James D. Logan

It is certified that error appears in the above-identified patent and that said Letters Patent are hereby corrected as shown below:

In the Abstract, line 3 change "preliminary" to

-- preliminarily --

In the description, column 4, line 65 change "aroung" to

-- around --

Column 6, line 49 change "attached" to -- attracted --

Claim 1, line 9 change "said" to -- side --

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*